US007516603B2

(12) United States Patent
Bennett

(10) Patent No.: US 7,516,603 B2
(45) Date of Patent: Apr. 14, 2009

(54) COTTON STRIPPER ROW UNIT

(76) Inventor: Lanney Bennett, 2214 S. Date St., Plainview, TX (US) 79072

( * ) Notice: Subject to any disclaimer, the term of this patent is extended or adjusted under 35 U.S.C. 154(b) by 0 days.

(21) Appl. No.: 12/175,902

(22) Filed: Jul. 18, 2008

(65) Prior Publication Data
US 2009/0019828 A1   Jan. 22, 2009

Related U.S. Application Data

(60) Provisional application No. 60/951,019, filed on Jul. 20, 2007.

(51) Int. Cl.
*A01D 46/12* (2006.01)
(52) U.S. Cl. .......................................... 56/33
(58) Field of Classification Search .................. 56/33, 56/14.2, 30, 28, 34, 36, 44, 49, 50, DIG. 9
See application file for complete search history.

(56) References Cited

U.S. PATENT DOCUMENTS

| | | | | |
|---|---|---|---|---|
| 2,759,316 | A | * | 8/1956 | Simpson et al. ............... 56/13.5 |
| 2,903,835 | A | * | 9/1959 | Kappelmann .................. 56/33 |
| 3,609,948 | A | * | 10/1971 | Jones et al. ................... 56/14.2 |
| 3,714,767 | A | * | 2/1973 | Hubbard et al. ............... 56/208 |
| 3,716,976 | A | * | 2/1973 | Copley et al. ................. 56/106 |
| 4,125,988 | A | * | 11/1978 | Schlueter ....................... 56/30 |
| 4,338,770 | A | * | 7/1982 | Schlueter ....................... 56/33 |
| 4,344,271 | A | * | 8/1982 | Schlueter et al. ............. 56/13.6 |
| 5,311,728 | A | * | 5/1994 | Schlueter ....................... 56/33 |
| 5,394,679 | A | * | 3/1995 | Schlueter ....................... 56/30 |
| 5,490,372 | A | | 2/1996 | Schlueter ....................... 56/33 |
| 5,806,290 | A | * | 9/1998 | Deutsch et al. ................ 56/32 |
| 5,842,332 | A | * | 12/1998 | Schreiner ....................... 56/28 |
| 5,924,269 | A | | 7/1999 | McMillen ....................... 56/66 |
| 5,960,618 | A | | 10/1999 | Kerber ......................... 56/119 |
| 6,018,938 | A | * | 2/2000 | Deutsch et al. ................ 56/32 |
| 6,212,864 | B1 | | 4/2001 | Harden et al. .................. 56/36 |
| 6,408,605 | B1 | | 6/2002 | Orsborn et al. ................ 56/41 |

* cited by examiner

*Primary Examiner*—Árpád Fábián-Kovács
(74) *Attorney, Agent, or Firm*—Charles D. Gunter, Jr.

(57) ABSTRACT

The present invention relates generally to a cotton stripper row unit for attachment to the front of a mobile harvester chassis for movement through a field with rows of cotton plants spaced at predetermined intervals. The cotton stripper row unit has a primary frame capable of attachment to the front of the mobile harvester chassis. A series of planar dividing walls extend perpendicularly outward from the front of the primary frame. A cotton row receiving mechanism is located between two planar dividing walls, and each adjacent cotton row receiving mechanism shares at least one common planar dividing wall. The separate cotton receiving mechanisms are capable of receiving a row of cotton plants upon movement through the field, and each cotton row receiving mechanism is made up of only one auger and two brush rolls.

7 Claims, 3 Drawing Sheets

COTTON STRIPPER ROW UNIT

CROSS-REFERENCE TO RELATED APPLICATION

The present application claims priority from earlier filed provisional application Ser. No. 60/951,019, filed Jul. 20, 2007, entitled "Cotton Stripper Row Unit" by the same inventor.

BACKGROUND OF THE INVENTION

1. Field of the Invention

The present invention relates generally to cotton strippers and, more specifically, to cotton strippers capable of harvesting narrowly spaced rows of cotton.

2. Description of the Prior Art

Cotton is typically grown in large fields, and planted in parallel rows which are spaced apart by a predetermined distance. Cotton strippers, which exist in a variety of configurations, are capable of harvesting four, to six rows of cotton with each pass. Presently available commercial cotton strippers, for example, the John Deere Model 7460 Cotton Stripper, typically include individual row units supported forwardly of a cross-auger frame. Cotton, along with cotton stalk and other debris, is swept from the row-receiving area by a pair of brush rolls supported on either side of the row of cotton and angling upwardly in the rearward direction. An auger supported above a rounded auger housing outwardly of each of the brush rolls conveys the material rearwardly to a cross auger. The row unit auger shafts are gear driven, and the axes of the brush roll shafts run at an angle to the axes of the auger shafts. Cotton plants enter a forwardly opening plant passage in the row unit as the harvester moves forwardly through the field, and the counter-rotating brush rolls strip the cotton from the plants. The row unit augers move the stripped cotton rearwardly from the harvesting compartment to the cross auger on the harvester.

U.S. Pat. No. 6,018,938, issued Feb. 1, 2000, to Deutsch et al., and assigned to Deere & Company, discloses a high capacity cotton harvester with a commonly seen design. The cotton harvester includes as many as eight or more brush type row units mounted on a cross auger system having a split cross auger structure with two auger portions for moving material inwardly toward a central location. Cotton is sucked through the rear of the central location into two separation chambers, one for each auger portion, and into the lower portions of two corresponding conveying ducts which extend upwardly and outwardly at bend locations located just above the rockshaft and below the cab floor. Each duct includes a nozzle directing air upwardly above the bend location so that cotton is sucked into the bend for better distribution in the duct. The ducts extend upwardly at an angle to the vertical direction and include uppermost sections extending rearwardly over the input sections of the two cleaners. The uppermost sections are angled from the horizontal plane and distribute the cotton evenly over cleaner inlets.

U.S. Pat. No. 4,338,770, issued Jul. 13, 1982, to Schlucter, and assigned to Deere & Company, also provides a detailed look at a row unit. As can be seen in FIG. 9 of this patent, each row unit has a central opening with a brush roll on either side of the opening. The brush rolls are, in turn, surrounded by a pair of rotating augers. This multiplicity and arrangement of parts, common to each row unit of the overall assembly, of necessity, takes up a predetermined width with respect to the spacing of the cotton rows being harvested.

With growing population sizes worldwide, it is becoming ever more prevalent to increase the efficiency of crop production and harvesting. For example, it is advantageous to increase the number of plant rows per acre of crop in order increase the density of crops available for harvest. However, once the number of rows per acre is increased, the number of rows a stripper is capable of harvesting in each pass must also be increased. Providing space on existing harvesters for the equipment necessary for adequate conveying and cleaning capacity for more than six rows of cotton, providing accessible drive for such equipment, and providing sufficient vertical range necessary for ground clearance and good ground-following ability have all been problems. Providing a narrow stripper unit which still has good picking efficiency, minimal cotton loss, and access to the brush roll and conveyor areas for servicing and cleaning blockages has been a continuing source of difficulty.

Despite the advances seen in the cotton stripper industry, a need therefore continues to exist for an improved cotton stripper capable of harvesting narrowly spaced cotton rows.

SUMMARY OF THE INVENTION

The present invention has as its general object to provide a cotton stripper row unit for attachment to a mobile harvester chassis for movement through a field with rows of cotton plants spaced at predetermined intervals.

The cotton stripper row unit comprises a primary frame capable of attachment to the front of the mobile harvester chassis. The primary frame has a length, terminating in a first and second extent, a front, a back, and a height relative to the mobile harvester. There are a series of planar dividing walls, beginning at the first extent of the primary frame and spaced equally along the length of the primary frame until terminating at the second extent of the primary frame. Each dividing wall extends perpendicularly outward from the front of the primary frame. A cotton row receiving mechanism is defined between two planar dividing walls. Each adjacent cotton row receiving mechanism shares at least one common planar dividing wall. The separate cotton row receiving mechanisms are capable of receiving a row of cotton plants upon movement through the field. Each cotton row receiving mechanism is made up of only one auger but with two brush rolls.

The two brush rolls located between each planar dividing wall form a cotton receiving opening. The spacing between adjacent cotton receiving openings is no greater than fourteen inches. The cotton row receiving mechanisms are permanently fixed to the primary frame. The number of dividing walls has a predetermined relationship to the number of cotton row receiving mechanisms employed in order to minimize space between the cotton receiving openings. According to this predetermined relationship, when "n" cotton row receiving mechanisms are present, then "n+1" planar dividing walls will be present in the preferred embodiment of the assembly. In one preferred embodiment of the invention, "n" is equal to eight, although it will be understood that more or less cotton row receiving mechanisms could be employed, where desired.

The present invention also provides a method of harvesting cotton from a field with narrow rows of cotton plants spaced at predetermined intervals, using a cotton stripper row unit, as described above, attachable to the front of a mobile harvester chassis. The cotton row receiving mechanism is provided with a cotton receiving opening between selected planar dividing walls, and the dividing walls are arranged so that adjacent cotton row receiving mechanisms share at least one common planar dividing wall so that the space between cotton receiving openings is minimized. The separate cotton row receiving mechanisms are capable of receiving a row of cotton plants upon movement through the field. The adjacent cotton row receiving mechanisms are aligned with the adjacent rows of cotton plants, allowing the mobile harvesting unit to traverse the cotton field and thereby harvest the cotton.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE INVENTION

The present invention provides a cotton stripper row unit that is capable of harvesting narrowly planted rows of cotton. The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Figure 1:
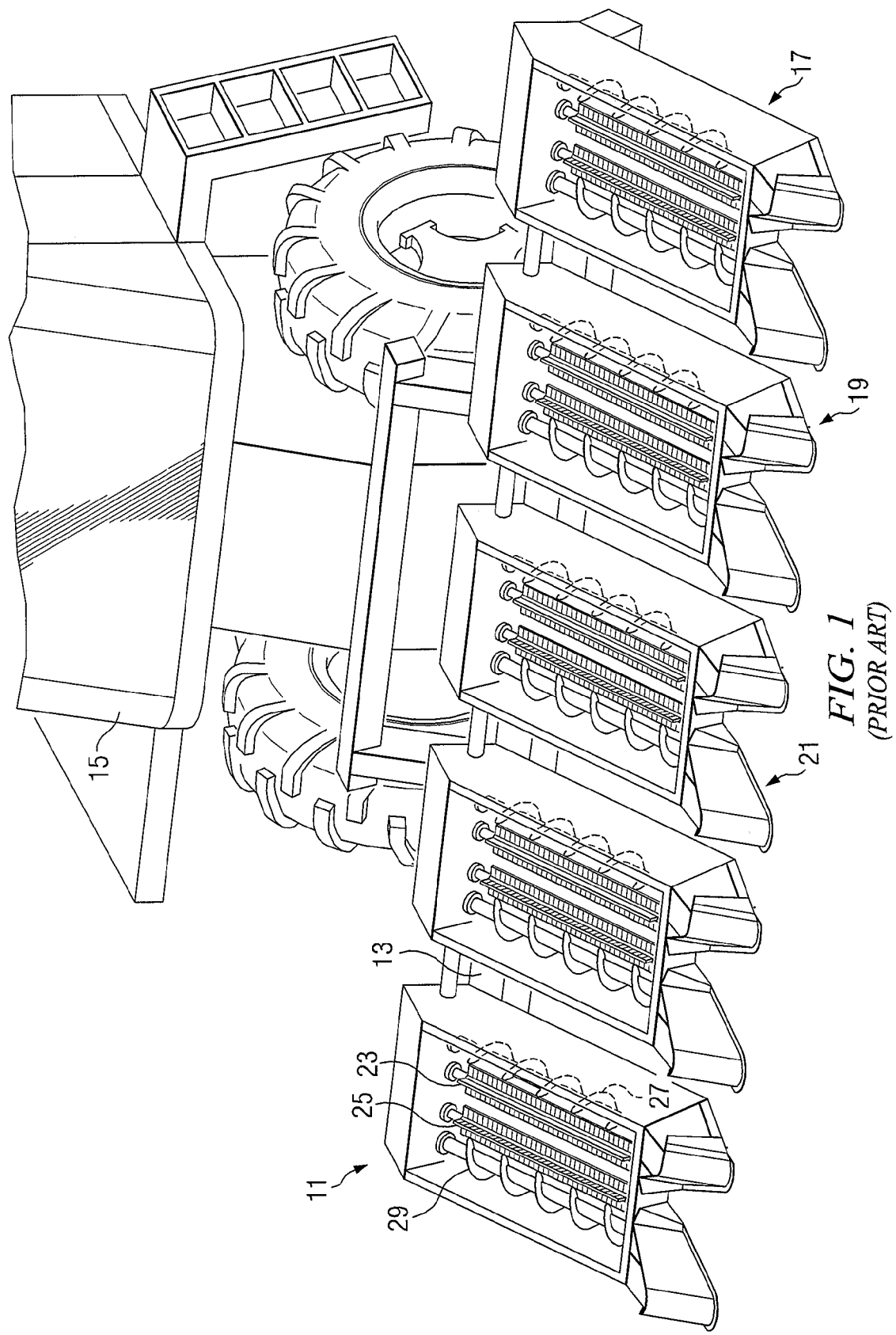
FIG. 1 is a front, perspective view of a prior art, commonly used cotton stripper row unit found in the prior art shown in place on a mobile harvester unit.
Figure 2:
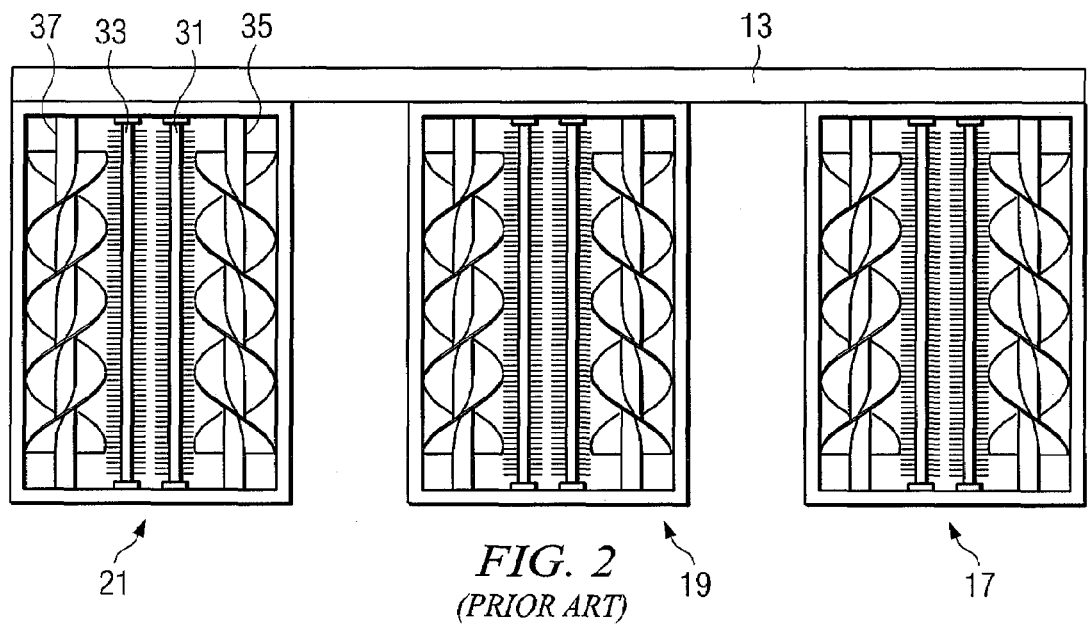
FIG. 2 is a simplified top view of the prior art row unit shown in FIG. 1.

To explain the differences in the structure and operation of the present invention, it is perhaps best to initially consider a typical state-of-the-art cotton stripper row unit, such as the unit shown in FIGS. 1 and 2 of the drawings. As will be apparent from the description which follows, in the existing prior art designs, the cotton striper 11 is mounted on a frame 13 which connects to the front of a mobile harvester unit 15, and a series of row harvesting units, such as units 17, 19, 21, extend outwardly from the frame. Each row harvesting unit is separately housed and comprises two brush rolls 23,25 placed between two augers 27, 29. The brush rolls 23, 25 separate the cotton bolls from the plant, as well as various debris, while the two augers 27, 29 in each unit move the separated cotton bolls to the rear of the row harvesting units. The stripped cotton bolls are then suctioned into the mobile harvester unit for storage.

In the case of the prior art unit illustrated in FIG. 1 of the drawings, the row harvesting units (e.g., 17, 19, 21) are adapted to be moved, or adjusted, along the length of the frame 13, thereby allowing the distances between each row harvesting unit to be modified or adjusted. However, in the case of narrowly planted rows of cotton, the row harvesting units are incapable of moving more than a limited amount of space closer to one another. The smallest crop rows that this design is capable of harvesting is equal to the distance between the cotton receiving openings of adjacent row harvesting units once each housing wall of each adjacent row harvesting unit comes into contact with one another. Commonly, this distance is around 24 inches or more. FIG. 2 is a top view of the prior art configuration illustrating the two brush rolls 31, 33 surrounded on either side by the pair of augers 35, 37 in the typical cotton stripper row unit. It will be appreciated that, while the individual units 17, 19, 21 can be moved somewhat closer together or farther apart on the frame 13, as by a conventional hydraulic mechanism, there is a limit to the space savings which can be achieved.

Figure 3:
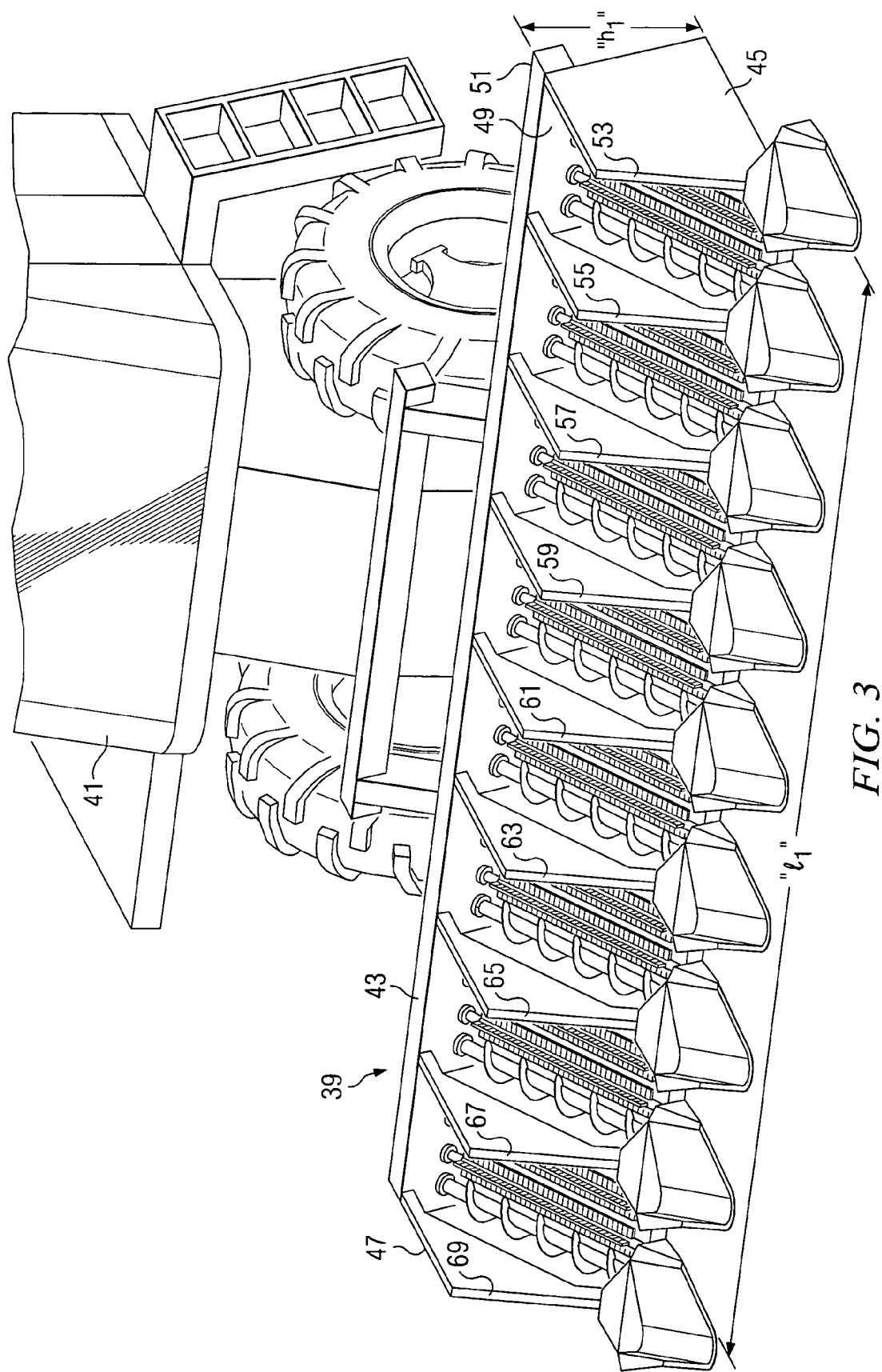
FIG. 3 is a front, perspective view of the cotton stripper row unit of the present invention attached to the front of a harvester unit.

The advantages of the design of the present invention will now be described with reference to FIGS. 3 and 4 of the drawings where there is illustrated the preferred cotton stripper row unit of the invention, designated as 39 in FIG. 3. The cotton stripper row unit 39 is again designed to be attached to the front of a commercially available mobile harvester chassis 41 for movement through a field with rows of cotton plants spaced at predetermined intervals. A primary frame 43 attaches to the front of the mobile harvester chassis 41 and has a length ("$l_1$" in FIG. 3) terminating in a first and second outer extents 45, 47, a front 49, a back 51, and a height ("$h_1$" in FIG. 3) relative to the mobile harvester.

There are a series of planar dividing walls 53, 55, 57, 59, 61, 63, 65, 67, 69, beginning at the first extent 45 of the primary frame 43 and spaced generally equally along the length "$l_1$" of the primary frame until terminating at the second extent 47 of the primary frame 43. As can be seen in FIG. 3, each dividing wall extends generally perpendicularly outward form the front surface 49 of the primary frame 43. What is referred to in this discussion as a "cotton row receiving mechanism" is defined between any two adjacent planar dividing walls, such as walls 53, 55, for example. The cotton row receiving mechanisms are permanently fixed to the primary frame in the preferred embodiment and are not adjustable from side to side, as was the case in the prior art design.

Figure 4:
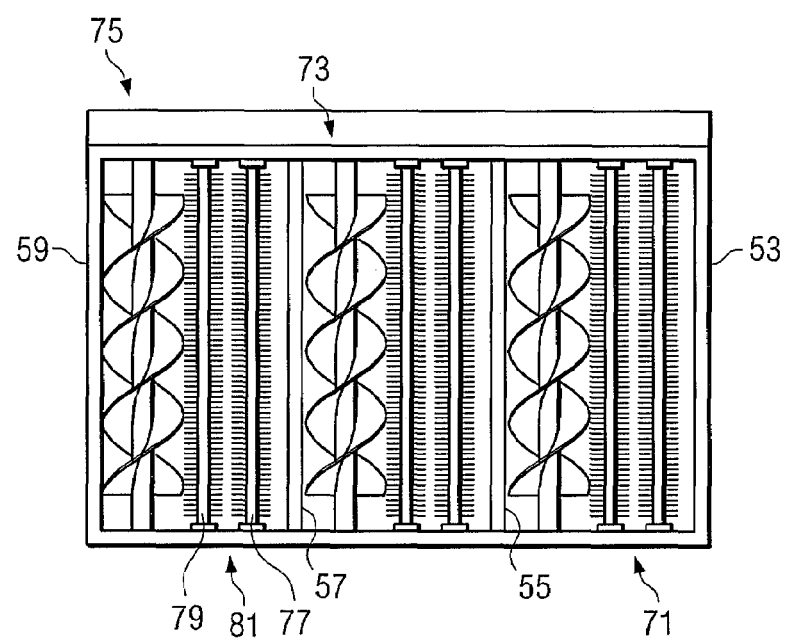
FIG. 4 is a top view of the row unit of FIG. 3, showing the different arrangement of the component parts of the cotton stripper row unit of the invention.

With reference to FIG. 4, it will be appreciated that each adjacent cotton row receiving mechanism shares at least one common planar dividing wall. For example, as best shown in FIG. 4, the cotton row receiving mechanism indicated generally at 71 shares the common planar dividing wall 55 with the cotton row receiving mechanism 73. Likewise, the cotton row receiving mechanism 73 shares the common planar dividing wall 57 with the cotton row receiving mechanism 75, etc. As will also be appreciated from the top view shown in FIG. 4, each cotton row receiving mechanism now has only one auger, but two brush rolls, as compared to the prior art view of FIG. 2, where each mechanism has two augers and two brush rolls. The respective components are also ordered differently in each of the cotton row receiving mechanisms.

The separate cotton row receiving mechanisms (i.e., mechanisms 71, 73 and 75 in FIG. 4) are capable of receiving a row of cotton plants upon movement through the field, with each cotton row receiving mechanism now being made up of only one auger and two brush rolls. The two brush rolls (such as rolls 77, 79 in FIG. 4) located between each of the planar dividing walls 57, 59 form a cotton receiving opening 81. The spacing between adjacent cotton receiving openings in no greater than 14 inches in the preferred embodiment of the invention.

The number of dividing walls has a predetermined relationship to the number of cotton row receiving mechanisms employed in order to minimize space between the cotton receiving openings. Specifically, when "n" cotton row receiving mechanisms are present, then "n+1" planar dividing walls will be present. In one preferred embodiment of the present invention illustrated in FIG. 3, "n" is equal to eight.

The present invention also provides a method of harvesting cotton from a field with narrow rows of cotton plants spaced at predetermined intervals using the cotton stripper described above. Once the cotton stripper unit is attached to the front of a mobile harvester chassis, the adjacent rows of cotton plants are aligned with each adjacent cotton row receiving mechanism (i.e., mechanisms 71, 73 and 75 in FIG. 4) so that cotton plants enter the cotton row receiving mechanism as the mobile harvester unit moves forwardly through the field.

An invention has been provided with several advantages. The cotton stripper row unit is capable of harvesting narrowly spaced rows of cotton, leading to an increased crop density capacity. The assembly of the invention is simple in design and relatively economical to manufacture. The assembly can easily be adapted to any of a number of commercially available mobile harvesters without requiring drastic modifications of the harvesters.

While the invention has been shown in only one of its forms, it is not thus limited but is susceptible to various changes and modifications without departing from the spirit thereof, as described in the claims which follow.

What is claimed is:

1. A cotton stripper row unit for attachment to the front of a mobile harvester chassis for movement through a field with rows of cotton plants spaced at predetermined intervals, the cotton stripper row unit comprising:
   a primary frame capable of attachment to the front of the mobile harvester chassis, the primary frame having a length terminating in a first and second extent, a front, a back, and a height relative to the mobile harvester;
   a series of planar dividing walls, beginning at the first extent of the primary frame and spaced equally along the length of the primary frame until terminating at the second extent of the primary frame, each dividing wall extending perpendicularly outward from the front of the primary frame;
   wherein a cotton row receiving mechanism is defined between two planar dividing walls, and wherein each adjacent cotton row receiving mechanism shares at least one common planar dividing wall; and
   wherein the separate cotton row receiving mechanisms are capable of receiving a row of cotton plants upon movement through the field, each cotton row receiving mechanism being made up of only one auger and two brush rolls.

2. The cotton stripper row unit of claim 1, wherein the two brush rolls located between each planar dividing wall form a cotton receiving opening, and wherein the spacing between adjacent cotton receiving openings is no greater than fourteen inches.

3. The cotton stripper row unit of claim 1, wherein the number of dividing walls has a predetermined relationship to the number of cotton row receiving mechanisms employed in order to minimize space between the cotton receiving openings and when "n" cotton row receiving mechanisms are present, then "n+1" planar dividing walls will be present.

4. The cotton stripper row unit of claim 3, wherein "n" is equal to eight.

5. The cotton stripper row unit of claim 1, wherein the cotton row receiving mechanisms are permanently fixed to the primary frame.

6. A method of harvesting cotton, from a field with narrow rows of cotton plants spaced at predetermined intervals, using a cotton stripper unit attachable to the front of a mobile harvester chassis, the method comprising the steps of:
   providing a primary frame capable of attachment to the front of the mobile harvester chassis, the primary frame having a length terminating in a first and second extent, a front, a back, and a height relative to the mobile harvester;
   providing a series of planar dividing walls, beginning at the first extent of the primary frame and spaced equally along the length of the primary frame until terminating at the second extent of the primary frame, each dividing wall extending perpendicularly outward from the front of the primary frame;
   providing a cotton row receiving mechanism with a cotton receiving opening between selected planar dividing walls and arranging the dividing walls so that adjacent cotton row receiving mechanisms share at least one common planar dividing wall so that the space between cotton receiving openings is minimized;
   wherein the separate cotton row receiving mechanisms are capable of receiving a row of cotton plants upon movement through the field, each cotton row receiving mechanism being made up of one auger and two brush rolls; and
   aligning adjacent rows of cotton plants with each adjacent cotton row receiving mechanism so that cotton plants enter the cotton row receiving mechanism as the mobile harvester unit moves forwardly through the field.

7. The method of claim 6, wherein the two brush rolls located between each planar dividing wall form a cotton receiving opening, and wherein the spacing between adjacent cotton receiving openings is no greater than fourteen inches.

* * * * *